M. WEISENFELD.
MALT TURNING IMPLEMENT.
APPLICATION FILED DEC. 10, 1910.
1,034,545.
Patented Aug. 6, 1912.
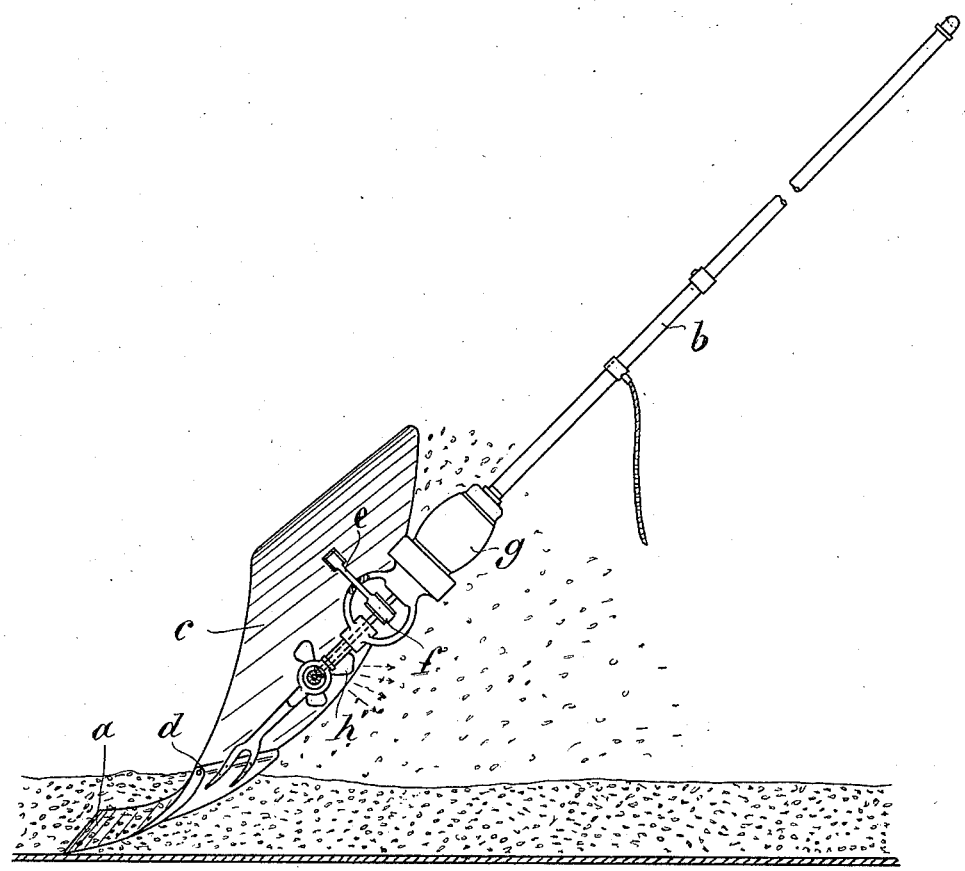
Witnesses:
Clarissa Franck
Edw S. Dubois
Inventor
Max Weisenfeld
by
his Attorney

UNITED STATES PATENT OFFICE.

MAX WEISENFELD, OF MUNICH, GERMANY.

MALT-TURNING IMPLEMENT.

1,034,545.   Specification of Letters Patent.   Patented Aug. 6, 1912.

Application filed December 10, 1910. Serial No. 596,574.

*To all whom it may concern:*

Be it known that I, MAX WEISENFELD, citizen of Germany, residing at Munich, in the Kingdom of Bavaria, German Empire, have invented certain new and useful Improvements in Malt-Turning Implements; and I do hereby declare the following to be a full, clear, and exact description of the invention, such as will enable others skilled in the art to which it appertains to make and use the same.

Malt is turned either by hand or mechanically, by lifting it with the help of shovels, rakes or grippers and turning it, so that it comes to lie on another portion of the floor. This manner of turning has the disadvantage that on the one hand the germinating grains or shoots are often not sufficiently separated and made accessible to the air and again on the other hand, it frequently happens, that the airing is too intense and therefore detrimental to the malt shoots.

The present invention relates to a process and device for turning malt and other germinating products, in which the above-mentioned disadvantages are remedied in a simple manner.

The essential feature of the present invention is the arrangement that the malt during the process of turning is subjected to a vibratory movement, imparted to it by the shovel or other turning implement, so that the single grains become separated and the surface of each single grain is exposed to the air.

Reference being had to the accompanying drawing, which shows a side elevational view partly in section of a simple device embodying my invention, $a$, $c$ is a plow-like shovel, the lower part $a$, being rigidly connected to the handle or stick $b$, while the upper portion $c$ is hinged at $d$ to the lower part $a$. Said upper part $c$ connects by means of a rod $e$ with an eccentric $f$, rotated by a suitable motor $g$. By these means the part $c$ of the shovel is rapidly vibrated and these vibrations are imparted to the grain on the shovel.

In order to increase and perfect the ventilation of the grain, in the form of construction here shown a small ventilator $h$ is provided, suitably driven by the motor $g$, and adapted to blow air through the malt thrown off at the rear edge of the shovel. As this ventilator operates directly above the malt, it will naturally blow chiefly the air resting directly above the malt through the single grains.

The device here described is pushed along the malt-floor and through the malt, in the manner of a plow.

It must be mentioned that the device according to the present invention is naturally applicable to mechanical malt-turners, in which the vibration of the shovels and the ventilation may be varied in accordance with the construction of the machine as a whole, whereby however the essential idea of the invention is not altered.

What I claim for my invention and desire to secure by Letters Patent, is:

1. In a malt turning implement, the combination with a handle and a shovel member rigidly carried thereby, of a second hinged shovel member, and means adapted to directly vibrate one of said members.

2. In a malt turning implement, the combination with a handle, of a shovel member rigidly carried thereby, a second shovel member hinged to the first named member and means for directly vibrating said second named member.

3. In a malt turning implement, the combination with a handle, of a shovel member rigidly carried thereby, a second shovel member hinged to said first named member, a motor, and a connection from the motor to said hinged member whereby the latter is vibrated from said motor.

4. In a malt turning implement, the combination with a handle, of a shovel member rigidly carried thereby, a second shovel member hinged to said first named member, a ventilator, and means adapted to simultaneously operate said ventilator and vibrate said hinged shovel member.

5. In a malt turning implement, the combination with a handle, of a shovel member rigidly carried thereby, a second shovel member hinged to said first named member, a motor carried by said handle, an eccentric mounted on the motor shaft, a rod extending from the eccentric to the hinged shovel member whereby the latter is vibrated from the motor, and a ventilator arranged between the fixed shovel member and the motor and adapted to be driven from the latter.

6. In a malt turning implement, the combination with a handle, of a rigid shovel member, a movable shovel member, and means for intermittently actuating the latter to produce vibration thereof.

7. In a malt turning implement, the combination with a shovel member adapted to be moved along a floor to elevate articles therefrom, of a second shovel member operatively connected with said first named member and adapted to receive the articles elevated thereby, and means acting directly against one of said shovel members to vibrate the same.

In testimony whereof I hereunto affix my signature in the presence of two witnesses.

MAX WEISENFELD.

Witnesses:
ARTHUR V. W. COTTER,
MATHILDE K. HELD.

Copies of this patent may be obtained for five cents each, by addressing the "Commissioner of Patents, Washington, D. C."